B. FRANKENFIELD.
SYSTEM OF DISTRIBUTION.
APPLICATION FILED OCT. 14, 1908.

921,392.

Patented May 11, 1909.

Witnesses:
Rob. C. Stoll
Chas. L. Byron

Inventor:
Budd Frankenfield
By Chas. E. Lord
Attorney

UNITED STATES PATENT OFFICE.

BUDD FRANKENFIELD, OF MILWAUKEE, WISCONSIN, ASSIGNOR TO ALLIS-CHALMERS COMPANY, A CORPORATION OF NEW JERSEY.

SYSTEM OF DISTRIBUTION.

No. 921,392.　　　Specification of Letters Patent.　　　Patented May 11, 1909.

Application filed October 14, 1908. Serial No. 457,625.

*To all whom it may concern:*

Be it known that I, BUDD FRANKENFIELD, a citizen of the United States, residing at Milwaukee, in the county of Milwaukee and State of Wisconsin, have invented certain new and useful Improvements in Systems of Distribution, of which the following is a full, clear, and exact specification.

My invention relates to systems of distribution, and is a modification of the invention set forth in my prior patent No. 850,217, granted April 16, 1907. In the arrangement shown in Figures 2, 3, and 4 of said prior patent, a balancer set is connected to a three wire system, and a booster generator is mechanically connected to the balancer set and has its armature electrically connected in the neutral wire between the load and the balancer set. With that arrangement the booster armature carries the whole neutral current, the sum of the currents in the two balancer commutators. Its commutator is therefore necessarily quite large.

In my present invention it is the object to provide a system in which the booster armature will not have to carry as great a current as in such prior patent, and to obtain several other advantages over said prior patent. The booster armature, according to my present invention, carries substantially half of the neutral wire current instead of the whole of it, and the capacity of the booster need be only about half as great as in the balancer systems of my aforesaid prior patent.

The various novel features of my invention will appear from the description and drawing, and will be particularly pointed out in the claims.

Figure 1:
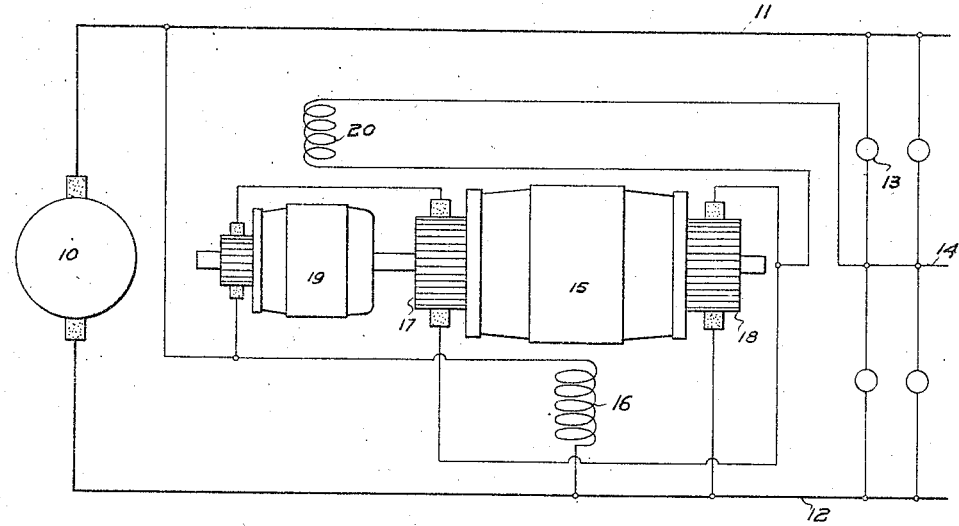
Figure 2:
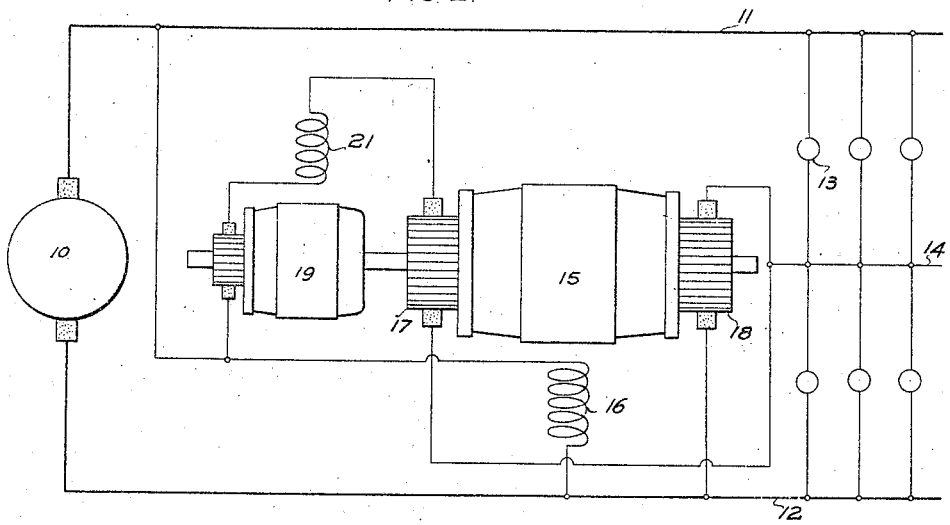

Fig. 1 shows a system of distribution embodying my invention; and Fig. 2 shows a modification.

The main source of current 10 is connected to the outer or main conductors 11 and 12 of a three wire system. The lights 13 or other load are connected between the main conductors 11 and 12, or between one of said mains and the neutral or compensating conductor 14. A balancer 15 is connected between the mains 11 and 12 and to the neutral conductor 14. This balancer may be either a dynamotor or a motor-generator. It is here shown as a dynamotor having a single shunt winding 16. The two commutators 17 and 18 of the balancer are connected between the neutral wire and the two outside mains respectively. In series with one of these commutators, here 17, is the armature 19 of the booster, which booster is mechanically connected to the balancer set as by being mounted on the same shaft therewith.

In Fig. 1, the booster field is excited by a coil 20 connected in the neutral wire between the load and the balancer. When the current is the same in the two sides of the system, and consequently there is no current in the neutral wire, the coil 20 conducts no current and the armature 19 generates no electro-motive force. The balancer 15 then runs as a double armature motor, absorbing only energy enough to supply its no load losses.

When the currents taken by the two sides of the system are unequal, there is current in the neutral wire and in the coil 20. If the current in the lower side of the system, or between the wires 12 and 14, is the heavier, the balancer winding connected to the commutator 18 acts as generator and that connected to the commutator 17 as motor, and the armature 19 increases or boosts the electro-motive force impressed on the winding connected to the commutator 17, the winding 20 being properly connected to obtain this last result. By thus increasing the electro-motive force impressed on the motor armature winding of the balancer, the electro-motive force generated by the generator balancer winding is increased to obtain the desired compounding effect and to maintain the voltages of the two sides of the system at their proper values. This effect is substantially in direct proportion to the neutral current.

When the current in the upper side of the system, or between the wires 11 and 14, is the heavier, the functions of the two armature windings of the balancers are interchanged, the windings connected to the commutators 17 and 18 acting as generator and motor respectively. The booster armature 19 is now in the secondary circuit of the balancer, and the current in it is opposite to what it was in the previous case. But the current in the coil 20 is also the reverse of what it was previously, so that, as before, the electro-motive force generated in the armature 19 tends to assist the flow of current through it. This increases the electromotive force impressed by the balancer on the circuit 11 and 14 and so produces the desired compounding effect. As before, this effect is substantially in direct proportion to the current in the neutral wire.

The booster armature 19 is thus sometimes in the primary circuit and sometimes in the secondary circuit of the balancer, according as the current in the lower or the upper side of the system is the heavier. In either case, the required compounding effect is produced, this effect being in proportion to the unbalancing of the current in the neutral wire. But the commutator of the booster carries only the current of one of the balancer armature windings, or substantially one-half of the neutral current, instead of, as in my aforesaid prior patent, the sum of the currents in the two balancer armature windings, or the total neutral current. Therefore the booster commutator need not be as large as in the arrangement shown in my prior patent.

The arrangement shown in Fig. 2 differs from that shown in Fig. 1 only in that the booster field coil is differently connected. In Fig. 2 the booster field coil 21 is connected in series with the booster armature. As the currents in the two sides of the system become unbalanced, the balancer armature windings will operate as motor and generator respectively as required, and the booster 19 will supply the electro-motive force to assist the flow of current through the balancer winding connected to the commutator 17 whether such winding be acting as motor or generator. But in Fig. 2 the electro-motive force of the booster is in proportion to the current in the balancer winding connected to the commutator 17, instead of being in proportion to the current in the neutral wire as in Fig. 1. These results would be nearly the same in practice.

Other modifications may be made in the precise arrangements here shown and described, and all such which do not involve a departure from the spirit and scope of my invention, I aim to cover in the following claims.

What I claim as new is:

1. In combination, a dynamo-electric machine unit having two armature windings each arranged to act as motor or generator as conditions require, and a booster armature connected continuously in series with one of said armature windings and arranged to assist the flow of current in the armature winding with which it is in series, whether such winding is acting as motor or generator.

2. In a three wire system of distribution, the combination of the three conductors of the system, a balancer comprising an armature winding connected between the neutral conductor and each of the main conductors, and a booster arranged to give a compounding effect to the balancer and to carry substantially half of the current in the neutral conductor.

3. In a multiple wire system of distribution, the combination of the two main conductors, a neutral conductor, a balancer set having an armature winding connected between the neutral conductor and each of the main conductors, a booster armature connected in series with one of the armature windings of the balancer set and between such winding and one of the conductors to which it is connected, and means for causing said booster armature to generate an electromotive force to assist the flow of current in the balancer armature winding with which it is in series.

4. In a multiple wire system of distribution, the combination of the two main conductors, a neutral conductor, a balancer set having an armature winding connected between the neutral conductor and each of the main conductors, a booster armature connected in series with one of the armature windings of the balancer set and between such winding and one of the conductors between which it is connected, and means for causing said booster armature to generate an electro-motive force which assists the flow of current in the balancer armature winding with which it is in series and which is substantially in proportion to the unbalancing of the system.

5. In a multiple wire system of distribution, main conductors, a neutral conductor, a balancer set having armature windings connected respectively between said neutral conductor and the main conductors of the system, and a booster armature connected in series with one only of the armature windings of the balancer when the system is unbalanced and arranged to generate an electro-motive force substantially in proportion to the unbalancing.

6. In a multiple wire system of distribution, two main conductors, a neutral conductor, a balancer having two armature windings connected respectively between said neutral conductor and said two main conductors, and a booster armature connected in series with one only of said balancer armature windings when the system is unbalanced and arranged to generate an electro-motive force which assists the flow of current through said winding whether the latter is acting as motor or generator.

7. In a multiple wire system of distribution, two main conductors, a neutral conductor, a balancer having two armature windings connected respectively between said neutral conductor and said two main conductors, and a booster connected in series with one only of said balancer armature windings when the system is unbalanced and arranged to generate an electro-motive force which assists the flow of current through said winding whether the latter is acting as motor or generator and is substantially in proportion to the difference in the currents on the two sides of the neutral wire.

8. In combination, a dynamo-electric machine unit having two armature windings and arranged to transmit energy in either direction, an armature winding connected in series with one only of the aforesaid armature windings when said unit is transmitting energy in either direction and arranged to rotate in a field which reverses according to the functions of the windings of the dynamo-electric machine unit.

9. In a multiple voltage system of distribution, the combination of main and compensating conductors, a balancer comprising a plurality of armature windings connected to said conductors, and a booster armature connected in series with less than all of the armature windings of the balancer when the system is unbalanced and arranged to generate an electro-motive force which assists the flow of current in the balancer armature winding or windings with which it is in series whether the latter be acting as motor or generator.

In testimony whereof I affix my signature, in the presence of two witnesses.

BUDD FRANKENFIELD.

Witnesses:
H. C. CASE,
CHAS. L. BYRON.